United States Patent

Wentworth, Jr.

[11] 4,124,218
[45] Nov. 7, 1978

[54] MECHANICAL SEAL MANUFACTURING PROCESS

[75] Inventor: Robert S. Wentworth, Jr., Temecula, Calif.

[73] Assignee: Borg-Warner Corporation, Chicago, Ill.

[21] Appl. No.: 837,790

[22] Filed: Sep. 29, 1977

[51] Int. Cl.² .................. F16J 15/06; F16J 15/36
[52] U.S. Cl. ........................................... 277/1; 277/9; 277/86; 277/165; 277/207 A; 29/522 R
[58] Field of Search ............... 277/1, 9, 9.5, 81 R, 277/86, 92, 87, 165, 207 A; 29/156.6, 522 R

[56] References Cited

U.S. PATENT DOCUMENTS

| 1,856,581 | 5/1932 | Mitchell | 277/207 A X |
|---|---|---|---|
| 1,930,766 | 10/1933 | Moore | 277/207 A X |
| 1,976,589 | 10/1934 | Trickey | 277/207 A X |
| 2,995,391 | 8/1961 | Snyder | 277/92 X |
| 3,129,964 | 4/1964 | McNeil | 277/9 X |
| 3,388,913 | 6/1968 | Tracy | 277/92 X |
| 3,582,041 | 6/1971 | Priese | 277/177 X |
| 3,898,163 | 8/1975 | Mott | 29/522 R X |

FOREIGN PATENT DOCUMENTS 669,453  8/1963  Canada ....................................... 277/1

Primary Examiner—Robert S. Ward, Jr.
Attorney, Agent, or Firm—Aubrey L. Burgess

[57] ABSTRACT

In mechanical seals adapted to perform in high temperature environments, fragile gaskets characterized by poor elasticity and conformability are used to perfect a seal between adjacent parts. Gaskets may be made of graphite, carbon, asbestos and/or fiberglass containing material. In order to perfect such a seal, gaskets with a parallelogram cross-section are used. They are expanded radially and their cross-section changed when placed between two parts during assembly.

6 Claims, 4 Drawing Figures

MECHANICAL SEAL MANUFACTURING PROCESS

BACKGROUND OF THE INVENTION

Mechanical seals are frequently used in high temperature environments to separate fluids of different kinds. One form of high temperature seal is known as the bellows-type seal, i.e., a seal in which an expansible bellows is used. High temperature uses of mechanical seals dictate high temperature resistant gaskets retained and highly compressed between various parts by the use of bolts. These are in lieu of the more conventional rubber O-ring seals. Some of the more common gasket materials are those containing carbon, graphite, asbestos and/or fiberglass, i.e., fragile materials characterized by poor elasticity and conformability. In the absence of provisions for high clamping forces, the conventional gasket of such materials is precision formed with gasket surfaces and cross-sections matching the surfaces and cross-sections of their receiving cavities. By their very nature, such materials cannot readily be made to the degree of precision required to provide a leak-tight fit by close or precision fit alone, so that high clamping forces are required to perfect the seals. As can be readily understood, the known gaskets are relatively expensive because of their method of manufacture and have little ability to seal over even very slight surface flaws. And the product must be constructed to permit the requisite clamping forces.

THE INVENTION

According to the invention to be hereinafter described, high temperature, fragile gasket materials are formed with an initial cross-section in the shape of a parallelogram or similar shape, such that upon assembly in a gasket cavity and the fitting of the gasketed parts, the gasket is deformed and expands in a radial direction, thus filling the cavity and insuring a seal between the joined parts. The gaskets because of their very nature deform and provide the requisite expansion in certain directions to fill its cavity with a minimum of axial pressure. And when so deformed, such gaskets are tightly compressed in the area of actual sealing. Thus partially filled areas of the gasket cavity, if any, cause less serious problems than would otherwise be the case. The normally required bolting of parts to provide high clamping forces is not generally required; however, if desired, a greater range of expansion can be achieved to compensate for ill fitting parts by the use of the conventional bolting technique.

When securing carbon or other similar high temperature gasket materials to a metal bellows, space and weight requirements preclude the use of bolts. The invention herein described permits the use of high temperature gasket materials with a fairly low initial seating force during assembly, and, of course, in a bellows type seal.

THE DRAWINGS

DETAILED DESCRIPTION

Figure 1:
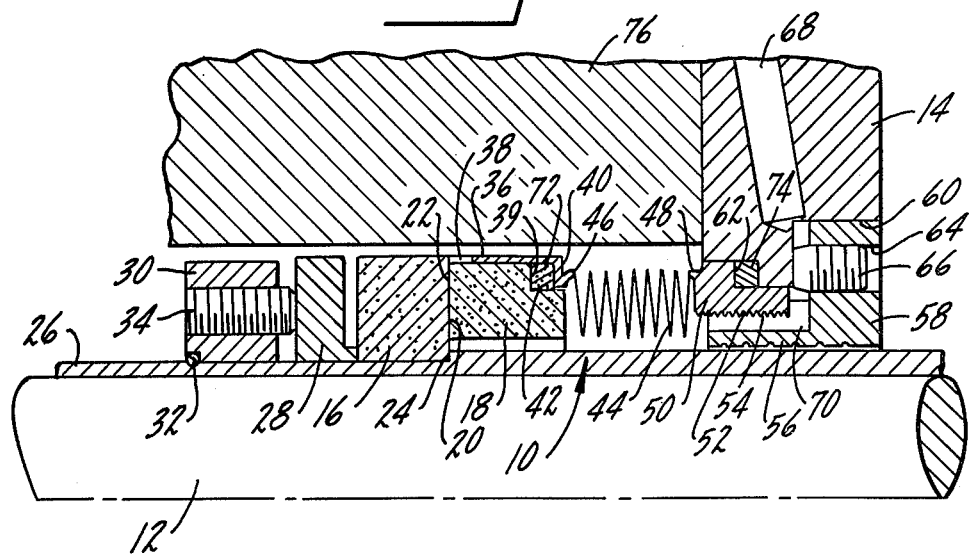
FIG. 1 is a partial longitudinal section through a typical bellows-type mechanical seal according to this invention.

Attention is invited to the drawings in which FIG. 1 shows a mechanical seal assembly, identified as 10 associated with a rotary shaft 12 and a seal flange 14, which comprises a pair of seal rings 16 and 18 having radially disposed engaging seal faces 20 and 22, respectively.

The seal ring 16 is rotatable with the shaft 12 and abuts a shoulder 24 on a sleeve 26 surrounding the shaft 12. In order to urge the seal ring 16 against the shoulder 24, there is provided a back-up ring 28 and a locking ring 30, the latter being connected, as by a snap ring 32 to the shaft 12. Two or more adjusting screws 34 received in the locking ring and bearing against the back-up ring 28 force the back-up ring 28 and seal ring 16 against the shoulder 24 and thereby lock it in position with a minimum of runout or distortion.

Figure 4:
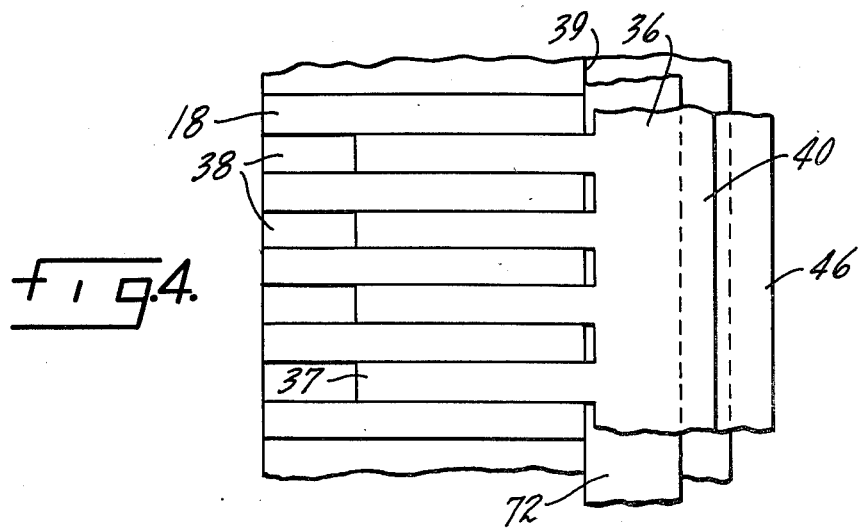
FIG. 4 is a detail of the bellows ferrule and seal ring connection.

The seal ring 18 is stationary and fixed, as will be described, to the flange 14. The seal ring 18 is surrounded by a metal ferrule 36 in which it is slip fit, fingers 37 in the ferrule 36 engaging notches 38 in the seal ring 18 to lock them against relative rotation, (see detail of FIG. 4). The ring 18 is also notched as at 39 to define, with a radial portion 40 of the ferrule 36, a substantially rectangular cavity 42. A bellows 44, generally constructed of annular elements welded together, is attached at one end, as by welding, to an annular bead 46 on the portion 40 of the ferrule 36. At the other end, the bellows 44 is welded to an annular bead 48 of a bellows support ring 50 internally screw threaded with threads 52. The threads 52 mate with screw threads 54 on an annular neck portion 56 of an anti-coking device or anti-spark bushing 58. The anti-coking bushing 58 is constructed totally or partially of nonferrous metal and is received in an annular cavity 60 in the flange 14; it surrounds and is spaced from the shaft 12 and the sleeve 26. Anti-static bushings, such as the bushing 58, are generally provided around ferrous rotating shafts when flammable or explosive conditions are expected. The seal assembly of this invention is adaptable for such usages. The ring 50 is notched and defines a substantially rectangular cavity 62 with the flange 14. The anti-coking bushing 58 is threadably bored at 64 to receive an adjusting screw 66 bearing against the support ring 50.

Passageway 68 is provided in the flange 14 which opens into the cavity 60; passageway 70 is provided in the anti-coking bushing 58 which opens at one end into the cavity 60 and at the other end at a location adjacent the shaft 12 axially of the bellows 44. A quench fluid may be introduced into the passageway 68 to flow through the passageway 70 and out from the seal between the sleeve 26 and the anti-coking bushing 58.

As is usual, one of the seal rings, as for example ring 18, is most commonly made of a carbon material, while the seal ring 16 may be of a stellite or faced with a stellite or other hard material.

The cavities 42 and 62 are such to each receive a ring gasket 72, 74, respectively, in order to provide a fluid-tight seal between the various parts.

Figure 2:
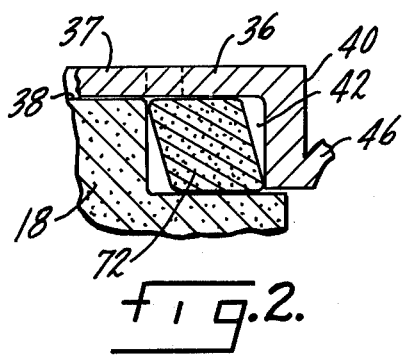
FIG. 2 is an enlarged, partial sectional view showing a parallelogram-sectioned gasket in a cavity before the distortion of the gasket.
Figure 3:
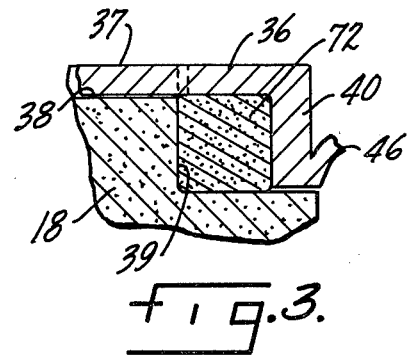
FIG. 3 is a view similar to FIG. 2 showing the gasket distorted.

Attention is now invited to FIGS. 2 and 3. FIGS. 2 and 3 illustrate in detail the seal ring 18 and the bellows 44 with a gasket 72 in the shape of a parallelogram in the cavity 42 with a loose fit. Upon assembly of the various parts and adjustment of the screw 34 the gasket 72 is distorted, causing it to move radially, generally filling the cavity 42, so that it assumes the appearance, in section, shown in FIG. 3. Thereafter, the spring load from the bellows and unbalanced hydraulic forces from the fluid being sealed clamp the gasket in place. The gasket 74 may be similar to the gasket 72. Sufficient pressure can be applied to distort the gasket 74 from its initial shape by adjustment of the set screw 66. In experimental use, used, distorted gaskets 72 from the cavity 42 have been used for gaskets 74 because high clamping force is available for the latter.

When used for high temperature environments, suitable gasket materials are selected from the group consisting of carbon, graphite, fiberglass and asbestos containing materials, which fragile materials exhibit poor elasticity and conformability. Preferably, gaskets of this invention are made from a laminated graphite known as "GRAFOIL" and produced by Union Carbide Co. As before stated, this invention permits the use of gaskets which do not require the usual degree of forming to precise shapes nor is flange bolting required — there need only be sufficient gasket material to fill the gasket cavity to perfect the seal between parts with sufficient force to distort and radially expand the gasket.

The seal assembly of this invention is usable in applications wherein there is a desired separation of fluids, as for example in a pump-motor combination wherein the pump is subjected to product fluid and the motor to a refined, controlled fluid. The latter is customarily used as the quench fluid. The flange 14 may be connected to the pump housing (76 for example) such that the pump is connected to the shaft at the right, as viewed in the drawings and the motor to the shaft at the left, also as viewed in the drawings. Moreover, the seal of this invention, because of the use of a shaft sleeve can be removed, as a unit, for service or replacement without disassembly of the seal components.

What is claimed is:

1. In a process of manufacturing a mechanical seal assembly having a pair of seal rings one of which is stationary and one of which is rotatable, and one of which is associated with a cylindrical ferrule which forms a substantially rectangular cross-sectional cavity with its seal ring, the improvement comprising assembling a seal ring, an annular gasket having a parallelogram shaped cross-section and the cylindrical ferrule with said gasket in the cavity, and radially expanding and deforming said gasket by the application of assembly pressure on the seal ring and ferrule until the gasket assumes substantially the cross-sectional shape of said cavity and substantially fills said cavity.

2. In a process as recited in claim 1 in which said gasket is constructed of fragile material characterized by poor elasticity and conformability.

3. In a process as recited in claim 2 in which said gasket material is especially usable in high temperature environments and is selected from the group consisting of graphite, carbon, asbestos and fiberglass containing materials.

4. In a process of manufacturing a mechanical device of at least a pair of parts with a fragile gasket therebetween, said parts defining a substantially rectangular cross-sectional cavity to receive said gasket, the improvement comprising assemblying said parts and an annular fragile gasket having a parallelogram shaped cross-section in said cavity and radially expanding and deforming said gasket by the application of pressure on the parts until the gasket assumes substantially the cross-sectional shape of said cavity.

5. In a process as recited in claim 4 in which said gasket is constructed of material characterized by poor elasticity and conformability.

6. In a process as recited in claim 5 in which said gasket material is especially usable in high temperature environments and is selected from the group consisting of graphite, carbon, asbestos and fiberglass containing materials.